Sept. 4, 1945.  C. SMITH  2,384,352
SIGNAL SYSTEM
Filed Oct. 12, 1942   5 Sheets-Sheet 1
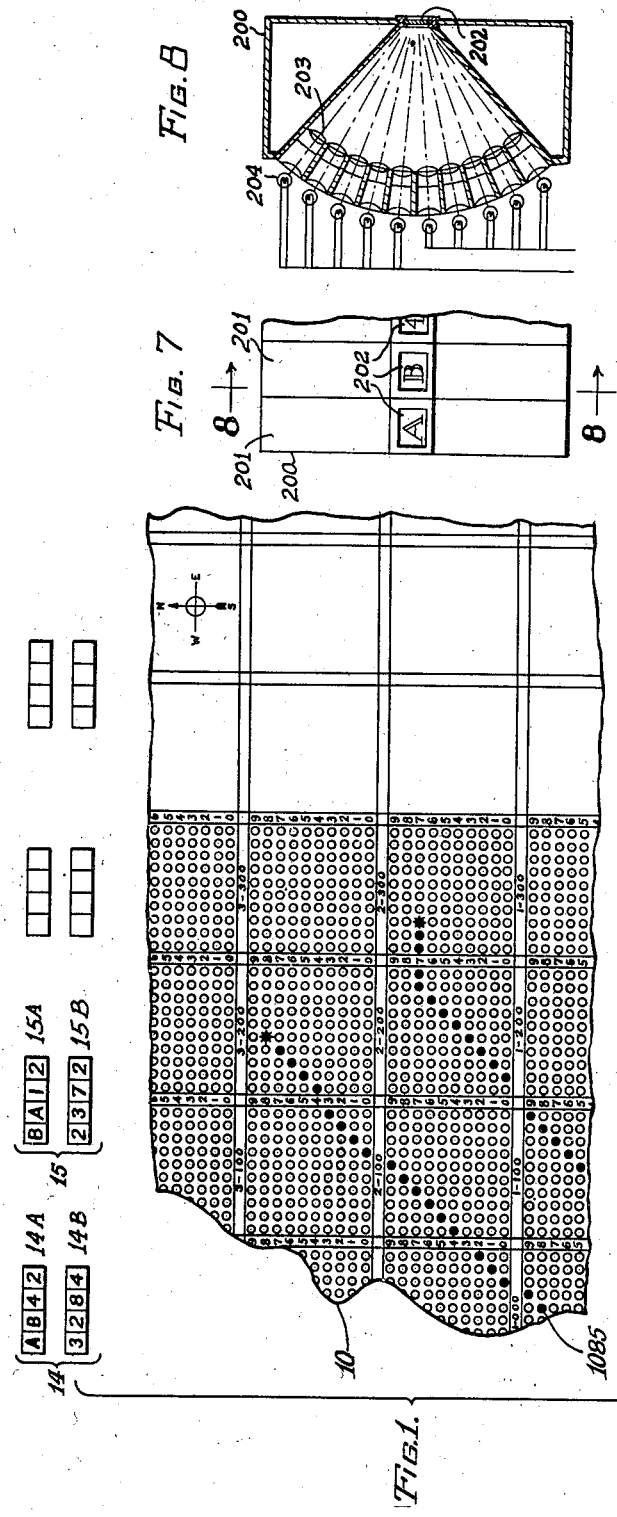
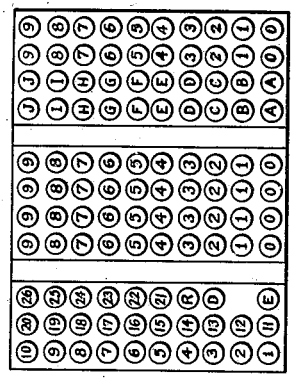
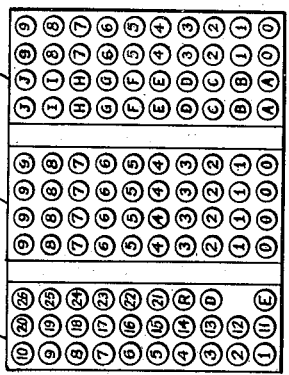
PARTIAL VIEW OF INFORMATION CENTER APPARATUS
Inventor:
Clyde Smith Sept. 4, 1945. C. SMITH 2,384,352
SIGNAL SYSTEM
Filed Oct. 12, 1942 5 Sheets-Sheet 2
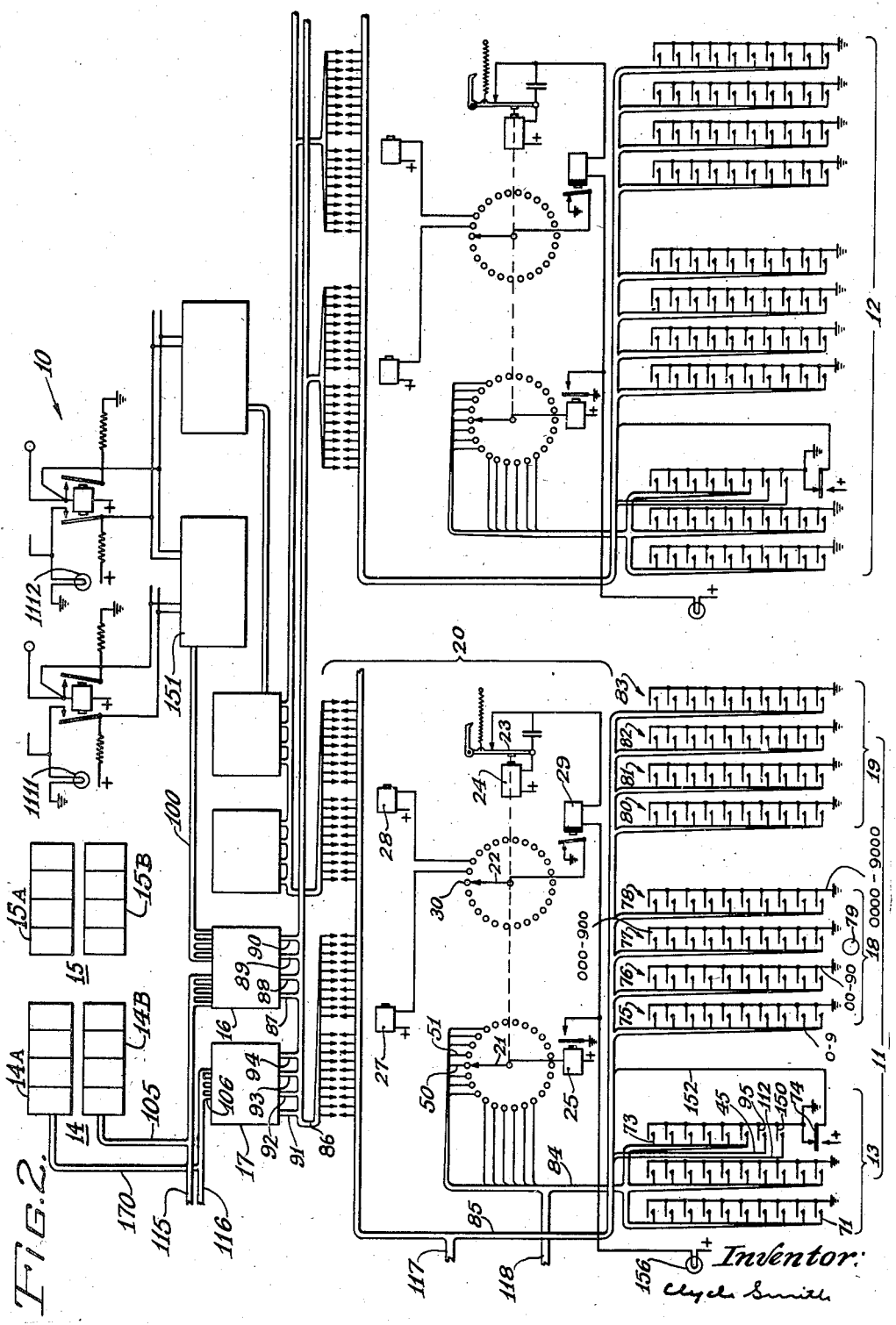

Sept. 4, 1945.  C. SMITH  2,384,352
SIGNAL SYSTEM
Filed Oct. 12, 1942  5 Sheets-Sheet 3

Inventor:
Clyde Smith

Sept. 4, 1945.   C. SMITH   2,384,352
SIGNAL SYSTEM
Filed Oct. 12, 1942   5 Sheets-Sheet 5

Inventor
Clyde Smith

Patented Sept. 4, 1945

2,384,352

UNITED STATES PATENT OFFICE 2,384,352

SIGNAL SYSTEM

Clyde Smith, Hopkinsville, Ky.

Application October 12, 1942, Serial No. 461,667

6 Claims. (Cl. 177—353)

This invention pertains to signal systems in which lamps are positioned to form a display field and individual lamps in the field are lighted in steady glow and others in flashing glow for conveying information.

Objects of the invention are to provide a lamp field, to provide means for selecting lamps one by one, to provide means for illumination of selected lamps in steady glow, to provide further means for connecting one only selected lamp in a circuit for flashing glow, and to provide means for operating a number of groups of glowing lamps through control of a smaller number of operator keyboards.

A further object of this invention is to provide means for flashing a latest selected lamp to convey knowledge of progress of consecutive selections thus showing direction of flight planes. Thus progress of an enemy flight of planes may be anticipated and warning of air raid may be given in advance of arrival of the enemy flight to the air defense command headquarters for defensive action and for orders to air raid warning posts.

A further object of this invention is to provide an operator keyboard and associated apparatus such that an operator may select a flight indicator device, may control the indicator device to display information of the planes composing the flight and may control the indicator device further to display a number identifying the location of the flight in the lamp field.

These objects are attained in a structure to register progress of flights of airplanes over a terrain, by providing a lamp field representing the terrain and identifying each lamp by thousands, hundreds, tens and units, by providing a pair of flight indicators for each flight and by providing a keyboard which will select flight indicators, will set up and maintain a display of information on the indicators, will select field lamp after field lamp, will connect the last selected field lamp to a commutator and will connect previously selected field lamps to a uniform current source for steady glow.

The invention will be more fully understood by the following description and by the accompanying drawings, in which Fig. 1 shows a portion of a lamp-field map, with flight indicators and keyboards, Fig. 2 shows circuits and assembly of an operating system, Fig. 3 shows a set of register relays, Fig. 4 shows a further set of register relays, Fig. 5 shows a relay selector.

Fig. 7 is a diagrammatic partial front view of an indicating device; and

Fig. 8 shows the indicator of Fig. 7 diagrammatically in section along lines 8—8 in Fig. 7.

Figure 3:
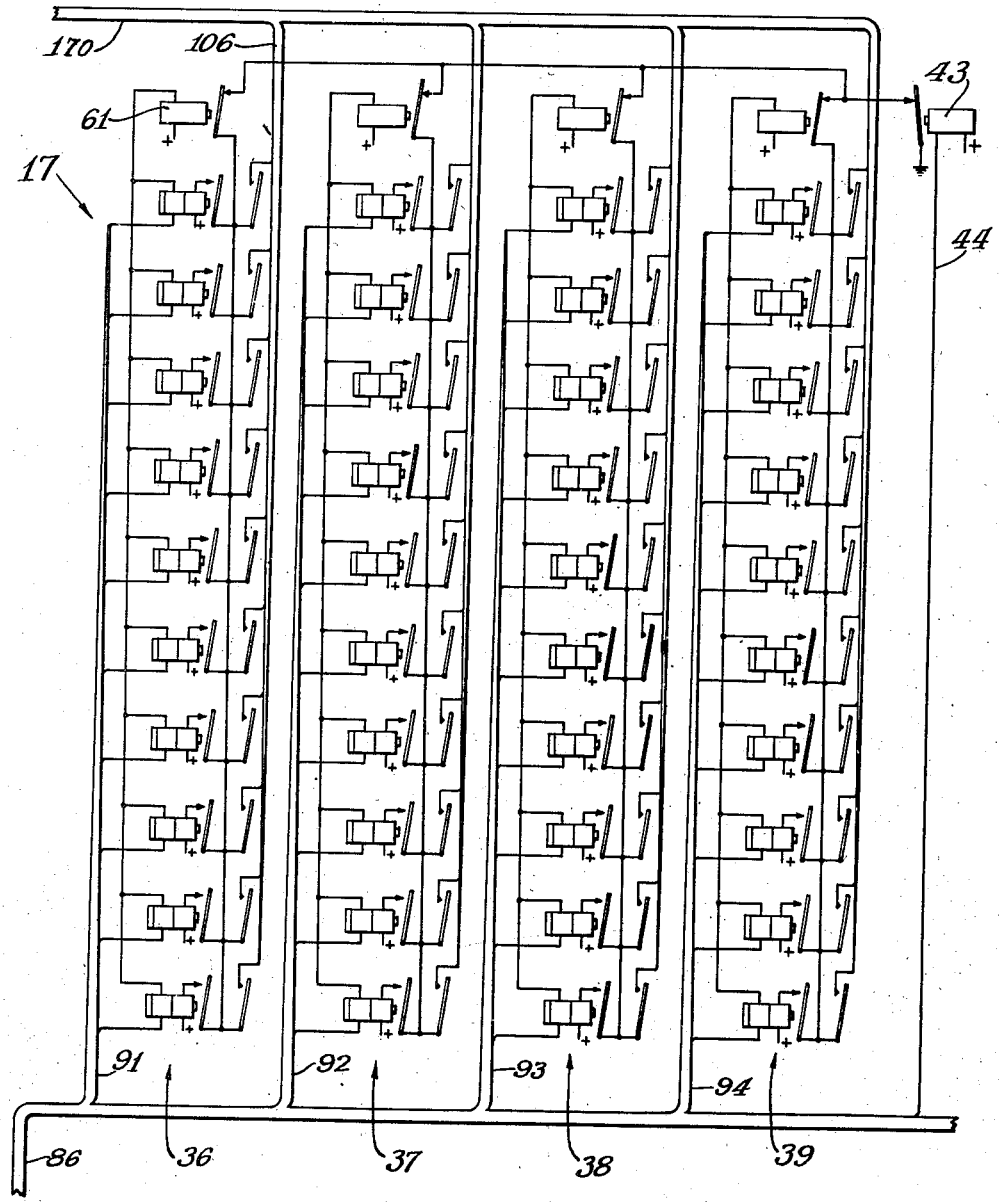

In Fig. 1 there is illustrated a lamp field 10 10,000 lamps of which a plurality of lamps in each of the first four thousands are shown. There are indicated also two pairs of flight indicators 14 and 15 which may be of a preferred design of carriage call type responsive to control by relays in the registers 16 and 17. A suitable display device or indicator is disclosed in my co-pending application Ser. No. 339,113, filed June 6, 1940, and also in my Patent No. 1,978,094, issued October 23, 1934. The diagrams Figs. 7 and 8 explain the principal structure of such an indicating device. Referring now to these diagrams, numeral 200 designates the housing of the indicator. Each indicator has a number of sections such as shown at 201, and each section is provided with a ground glass screen 202. There is thus one such ground glass screen 202 for each letter or numeral to be displayed. These sections are interiorly shielded as is shown, and in back of each section is a column of lenses 203 and lamps 204 individual thereto. The lamps and lenses of each column are adapted to project upon the ground glass screen associated with the column images of numerals or letters, as desired.

A complete first keyboard 11 is illustrated in Fig. 2 and a second keyboard 12 is indicated. The keyboard 11 comprises three sets of keys. Key set 13 comprises 26 keys 71 to 73 inclusive numbered from No. 1 to No. 26, all mutually locking so that operation of any one key unlocks for spring restoration all others of the 26 keys. A further key 74 has two positions, and remains in either position until changed by hand of the operator. This key is used in extinguishing lamps in the lamp field 10. Key set 18 comprises four strips 75, 76, 77, 78 of ten keys in each strip, numbered from 0 to 9, from 00 to 90, from 000 to 900 and from 0000 to 9000. In each strip the keys are mutually locking so that operation of any one key unlocks all others of the ten keys of that strip. Key set 18 is for controlling the selection of lamps in lamp field 10. A wholly mechanical key 79 releases all keys of the four strips. Key set 19 comprises four strips 80, 81, 82, 83 of non-locking keys, numbered or lettered as desired, and is used for setting the flight indicators such as 14A and 15A.

A rotary selector 20 has a brush 21 engaging a circular level of bank contacts and a further brush 22 engaging a further level of bank contacts. The brushes 21, 22 are driven in stepping manner by armature 23 of magnet 24 energized by current through an obvious circuit. Brush 21 is connected through winding of a relay 25 to battery. Brush 22 is connected through normally closed contact of slow-to-release relay 29 to ground. Winding of relay 29 and contacts of normally energized relay 25 are included in the circuit of magnet 24. The first and second bank contacts of brush 22 are respectively connected to winding of first gang relay 27, and winding of second gang relay 28. The 26th or normal contact 30 is not connected. The contacts engageable by brush 21 are connected through wires of cable 84 to the 26 keys 71 to 73 inclusive.

Figure 4:
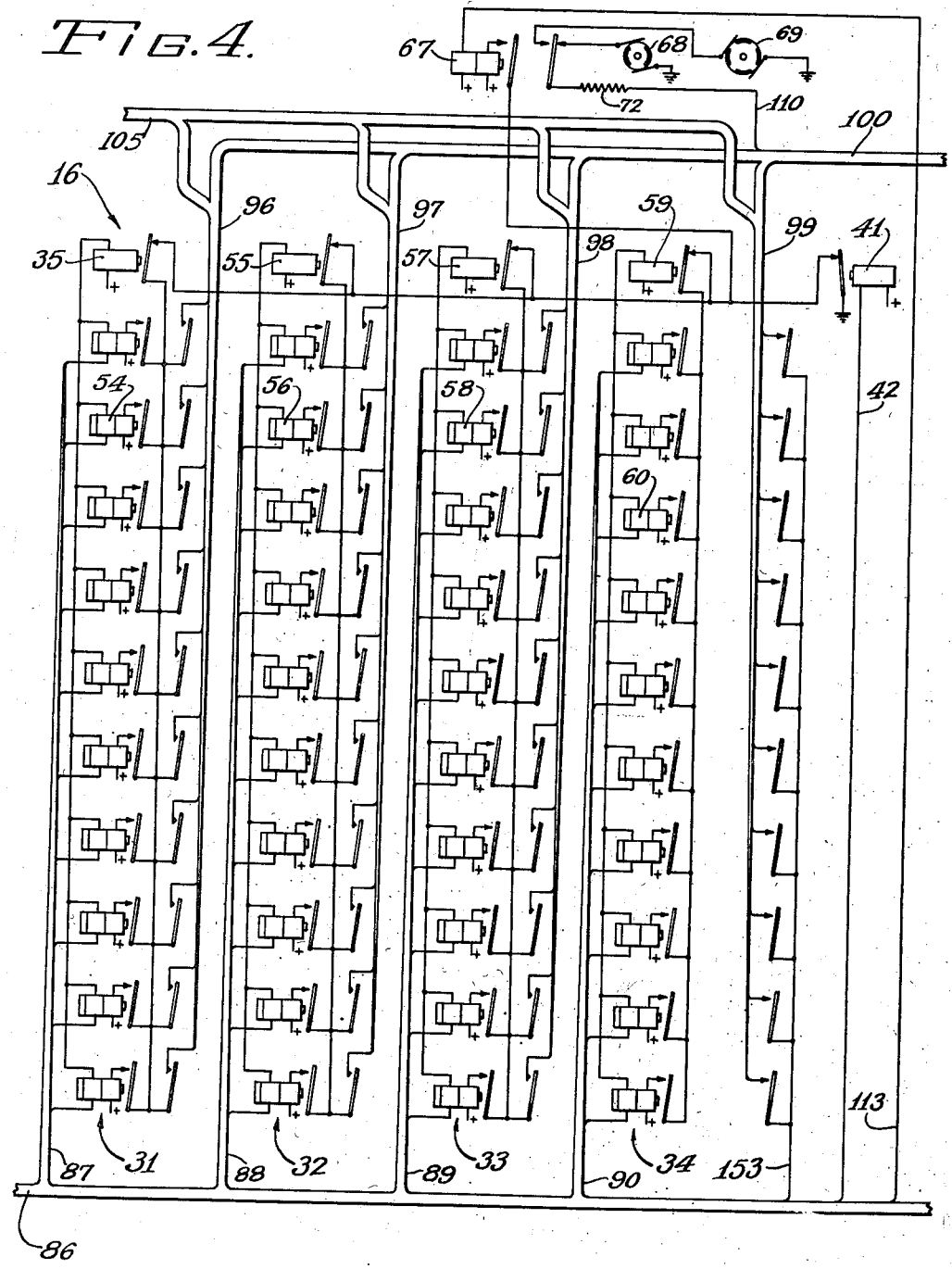

Ten keys in key strip 75 are connected through ten wires of cable 85 to ten contacts of gang relay 27 where while the relay 27 is in operated position they are connected through ten wires in cables 86 and 87 to operating windings of the thousands register relays 31 of which there are ten, Fig. 4. Ten keys in key strip 76 are connected through ten wires of cable 85, through relay 27 while operated and through ten wires in cables 86 and 88 and to the ten operating windings of the ten hundreds register relays 32. Ten keys in key strip 77 are connected through the wires of cable 85, through relay 27 while operated and through ten wires in cables 86 and 89 to the ten operating windings of the ten tens register relays 33. Ten keys in key strip 78 are connected through ten wires of cable 85, through relay 27 while operated and through ten wires in cables 86 and 90 to the ten operating windings of the ten units register relays 34.

The thousands relays 31 are provided with a holding circuit control relay 35, which has its winding in series with all of the operating windings of the slow-to-release register relays 31, which is energized when current flows through any operating winding of relays 31 thereby opening all holding circuits of relays 31 and which retires its armature before retirement of the armature of any operated relay 31 thereby closing the holding circuit of the operated register relay. Relays 32, 33, 34 are similarly provided with holding circuit control relays.

In like manner and through similar circuits, key strips 80, 81, 82, 83 control circuits through cable 85, contacts of gang relay 27 and cables 86, 91, 92, 93, 94 to operate relays 36, 37, 38, 39, Fig. 3, all of which are provided with holding circuit control relays similar to 35, Fig. 4. Contacts of relay 35 and other holding circuit control relays in Fig. 4 are connected through contacts of relay 41 to ground. Winding of relay 41 is connected to wire 42 in cable 86. Contacts of similar control relays in Fig. 3 are connected through contacts of relay 43 to ground. Winding of relay 43 is connected to wire 44 in cable 86. Wires 42 and 44 pass through cable 86 and unite upon one contact in relay 27 whence the circuit is extended through relay 27 contacts and wire 45 in cable 85 to non-locking key 95 to ground.

A relay selector comprises 1,110 relays 46, 47, 48 all of which are controlled by an associated relay register 16. Contacts of thousands register relays 31 are connected through cables 96, 100, 101 to windings of the thousands selector relays 46 of which there are ten. Contacts of hundreds register relays 32 are connected through cables 97, 100, 102 and in multipled connection to contacts of all thousands selector relays 46 where while any relay 46 is in operated position they are further connected to the windings of ten selected hundreds selector relays 47 of which there are one hundred for selecting 10,000 lamps. Contacts of tens register relays 33 are connected through cables 98, 100, 103 and in multipled connection to contacts of all hundreds selector relays 47 where while any relay 47 is in operated position they are further connected to the windings of ten tens selector relays 48 of which there are one thousand for selecting 10,000 lamps. Contacts of units register relays 34 are connected through cables 99, 100, 104 and in multipled connection to contacts of all tens selector relays 48 where while any tens selector relay 48 is in operated position they are further connected to the windings of ten field lamp relays as 1111', 1112', 1113' of which there may be ten thousand. Tens selector relays 48 are provided with further contacts. A grounded commutator 68 or 69 is connected through contacts of relay 67 and wire 110 in cable 100 to said further contacts where while any tens selector relay 48 is in operated position the commutator is further connected to lamp contacts in ten field lamp relays as 1112'.

Wires in cables 96, 97, 98, 99, Fig. 4, are connected respectively to wires in a cable 105 which extends to a flight indicator 14B and displays upon that indicator the lamp number of the lamp last selected by the relay selector. Circuits, apparatus and operation of this indicator may be similar to those shown in my copending application, Serial No. 339,113, or similar to those shown in my previously noted patent. Operation of any relay 36, 37, 38, 39, Fig. 3, will close a circuit through cable 170 to display a desired character in a connected indicator as 14A.

Orders for operating the system are telephoned from an information center to operators at keyboards as 11, 12, each of which through a selector as 20 has access to all registers as 16, 17.

Operation of the system illustrated is as follows:

The first order received may be assumed to be to operator of keyboard 11, "Flight 1, 1112, AB42." To execute this order, operator depresses locking key No. 1 in the set 71, 73 which comprises 26 consecutively numbered keys of which key No. 26 is normally depressed to provide a normal ground connection on wire 50 thus holding relay 25 normally energized. The depressed key No. 1 now grounds the wire 51 and by release of key No. 26 removes ground from wire 50. Relay 25 is deenergized, its contact closes the circuit of magnet 24 and relay 29, also of pilot lamp 156. Relay 29 removes ground from brush 22. Magnet 24 attracts its armature 23, breaks its energizing circuit and releases its armature which by power of spring 53 drives the brushes 21 and 22 one step. Brush 21 thus closes an energizing circuit for relay 25 through wire 51 and operated key No. 1 of key set 71, 73, and relay 25 opens the circuits of lamp 156 and magnet 24, preventing further operation of the armature 23. Relay 29 now releases its armature and closes an obvious circuit to energize relay 27 which connects keyboard 11 to register 16, 17. Using keys in order from left to right, the operator depresses locking keys "1112" in key set 18 and non-locking keys "AB42" in key set 19.

Key "1000" in key strip 75 energizes relays 35 and 54, Fig. 4, over a circuit through cables 85, 86, 87. Key "100" in key strip 76 energizes relays 55 and 56 over a similar circuit through cable 88. Key "10" energizes relays 57 and 58 over a similar circuit through cable 89. Key "2" energizes relays 59 and 60 over a similar circuit through cable 90. Operation of a non-locking key in key strip 80 closes a circuit through cables 85, 86, 91 to energize any relay 36 and also relay 61 which opens all holding circuits of all relays 36. Upon release of the non-locking key in key strip 80 and cessation of energizing current, the quick relay 61 releases its armature and closes a holding circuit for the operated relay 36 before the slow-to-release relay 36 can release its armature thus retaining the armature of the relay 36 and thus holding closed a circuit through contacts of relays 43, 61, 36 and cables 106 and 170 to the flight indicator 14A, Fig. 2. In like manner, keys in key strips 81, 82, 83 energize relays 37, 38, 39 to close circuits to the flight indicator 14A.

Figure 5:
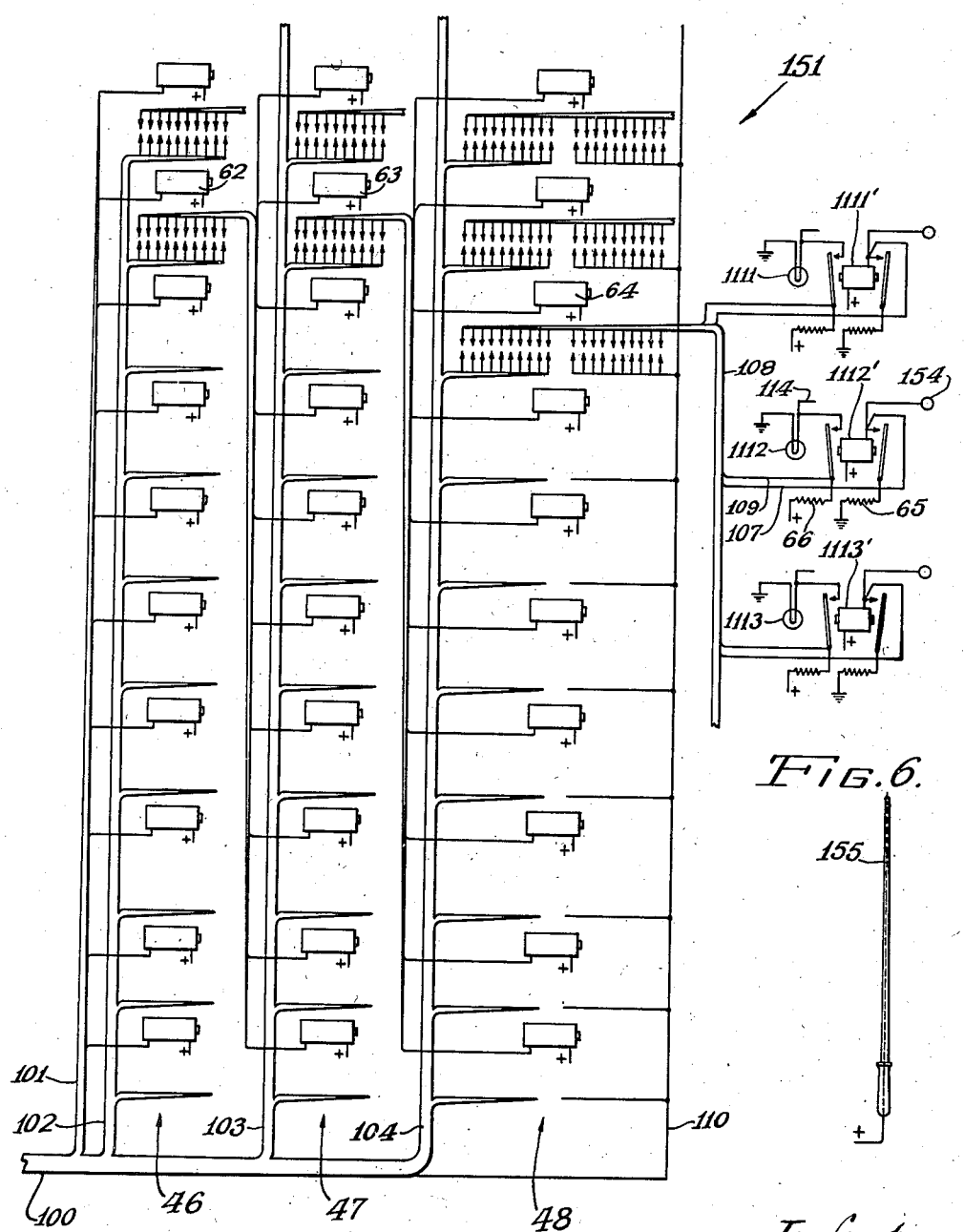

Relay 54 in operated position closes a circuit through contacts of relays 41, 35, 54, and cables 96, 100, 101 to energize relay 62, Fig. 5. Relay 56 closes a circuit through contacts of relays 41, 55, 56, cables 97, 100, 102 and contacts of operated relay 62 to energize relay 63. Relay 58 closes a circuit through contacts of relays 41, 57, 58, cables 98, 100, 103 and contacts of relay 63 to energize relay 64. Relay 60 closes a circuit through contacts of relays 41, 59, 60, cables 99, 100, 104, contacts in relay 64 and a wire 107 in cable 108 to the winding of field lamp relay 1112'. Relay 1112' operates one armature to close its holding circuit through resistance 65 and the other armature to close an illuminating circuit through resistance 66 for the field lamp 1112.

Relay 64 closes also a shunting circuit for the lamp 1112 from the lamp through contacts of relay 1112', wire 109 in cable 108, contacts of relay 64, wire 110 in cable 100, resistance 72, Fig. 4, contacts of relay 67 and "enemy code" interrupter 68 to ground, thus causing the latest selected lamp 1112 to flash the "enemy code" indicating that the registered flight is an enemy flight. Were the flight a defense flight, the order to the operator would have included the word "defense" and the operator would have operated momentarily the non-locking key 150 thus connecting to ground a circuit over wire 112, cable 85, contacts of relay 27, cable 86, wire 113, Fig. 4 and operating winding of holding relay 67 to battery. Relay 67 closes its holding circuit through contacts of relay 41 and operates an armature contact to remove conductor 110 from the "enemy code" commutator 68 and to connect the conductor 110 to the "defense code" commutator 69, thus flashing the latest selected lamp in defense code to indicate that the flight is a flight of defense planes.

The operator sits in a position for viewing the flight indicator and thereby checks upon the flight indicator the accuracy of the keyboard setting. The operator then operates the mechanical key 79 and the No. 26 key of the key set 71, 73. The key 79 restores all keys in key set 18, thus terminating the operating current in relays 35, 55, 57, 59, Fig. 4, as well as in the operated ones of relays 31, 32, 33, 34. Armatures of the quick relays 35, 55, 57, 59 operate quickly and close holding circuits through contacts of relay 41 for the operated ones of relays 31, 32, 33, 34. Key No. 26 of the key set 71, 73 grounds the wire 50 and releases key No. 1 to remove ground from wire No. 51. Relay 25 thus is deenergized and magnet 24 operates to drive the rotary brushes to normal.

Selection of additional lamps each adjacent a prior selected lamp produces a line of lamps. The selector 151 Fig. 2, detailed in Fig. 5, remains in its position of latest adjustment for selection and maintains closed the shunting circuit of the latest selected lamp over wires 109, 110 thus flashing the latest selected lamp. When adjustment of the selector 151 is changed to select another lamp this circuit is broken for the prior lamp which then glows steadily over the circuit of resistance 66.

When any line of illuminated lamps becomes undesirably long, an operator may put out the earlier selected lamps by using a selector of another flight indicator, operating the manual locking key 74 to engage its battery contact and then selecting one by one the lamps to be darkened. As each lighted lamp with energized field lamp relay as 1112' is selected the key 74 forms a shunting circuit for the energized relay extending from battery through contacts of key 74, wire 152, cable 85, contacts of relay 27, cable 86, wire 153, Fig. 4, contacts of operated register relay 60, cables 99, 100, 104, contacts of operated selector relay 64, cable 108, and wire 107 to a terminal of relay 1112', thus short-circuiting the winding of the relay 1112' which releases its armature and extinguishes the lamp 1112. Succeeding lamps in the line are selected and extinguished by operating only the units or ten keys of the key set 18.

When record of a flight is to be discontinued, the order to the operator is "Discontinue flight 1." The operator selects the "flight 1" selector by use of the rotary selector 20, extinguishes the lamps one by one by use of the key 74, then operates the key 95 which energizes relays 41 and 43, which relays in turn interrupt all holding circuits of all register relays. The operator then operates key No. 26 of key set 71, 73.

Figure 6:
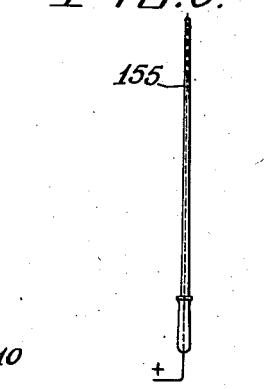
Fig. 6 shows a manual contactor.

Further means is provided for extinguishing lamps. Each lamp field relay as 1112' is provided with a contact plate, 154, manually accessible near the corresponding lamp in the lamp field and connected to one terminal of the relay winding. A manual contactor 155, Fig. 6 when manually engaged with the contact plate 154 short-circuits the relay winding and releases the armatures to extinguish the associated lamp.

Subsidiary lamp field map boards may be provided to represent the lamp field 10, Fig. 1, either in whole or in portions. For control of such subsidiary display boards at short distance from the primary board 10, field lamps may be connected in parallel with the field lamps of the field 10 over branching wires as illustrated by wire 114 connected to lamp 1112, Fig. 5, and additional flight indicators may be connected in parallel with the flight indicators 14 and others of Figs. 1 and 2 by branching wires as illustrated by branching cables 115, 116, Fig. 2.

When the subsidiary lamp field board is at a greater distance and a smaller number of wires is desirable, there may be provided branching cables as illustrated by cables 117 and 118, Fig. 2, connected to the keyboard cables 84 and 85, there being provided at the subsidiary lamp field board a complement of rotary selectors such as 20, registers such as 16, 17, relay selectors such as 151 and flight indicators such as 14, but no keyboards.

The system herein illustrated is capable of modification without departing from the fundamental features of the invention as claimed. What is claimed is:

1. In a signaling system, a number of signaling lamps, selective means for selecting and illuminating one of said lamps, two commutators having circuits controlled according to different signals of a code, a relay, a controlling circuit for for said selected lamp including contacts of said relay and including one only of said two commutators when said relay is in operated position and the other of said commutators when said relay is in normal position, a keyboard for controlling said selective means, controlling means in said keyboard for energizing said relay, a holding circuit in said selective means for holding said relay energized, and controlling means in said keyboard for interrupting said holding circuit.

2. In a signaling system, a plurality of lamps, means for selecting and illuminating one of said lamps, a shunt circuit connected around said selected lamp, an "enemy" code signal commutator connected in said shunt for flashing "enemy" code signals on said lamp, a "defense" code signal commutator, and means for substituting said "defense" code signal commutator for said "enemy" code signal commutator in said shunt circuit.

3. In a signaling system, a plurality of lamps, selective means for selecting one of said lamps and for subsequently abandoning said lamp, means associated with said selected lamp and responsive to said selective means for initiating illumination of said lamp, means in said selector for flashing said lamp in "enemy" code signal and in "defense" code signal and effective while said selective means is connected to said lamp, and means associated with said lamp for maintaining said lamp in continuous illumination after said selective means has abandoned said lamp.

4. In a signalling system, a display board representing a section of terrain, a plurality of lamps on said board sufficiently distributed over the whole area of the board so that any course on said terrain can be indicated by lighting a plurality of lamps on the corresponding line on said board, operator's control apparatus, selecting apparatus adapted to be operated and released a plurality of times to successively select a plurality of said lamps to indicate a course on said terrain, and means for lighting selected lamps including means for flashing any selected lamp upon selection thereof by said selecting apparatus and means for changing the flashing illumination of any selected lamp to continuous illumination upon the release of said selecting apparatus preparatory to selecting another lamp.

5. In a signalling system, a display board representing a section of terrain, a plurality of lamps on said board uniformly spaced in coordinate directions, a plurality of flight indicators associated with said display board, operator's control apparatus, means operated by said control apparatus to cause said flight indicators to display flight information concerning a plurality of flights of planes, means operated by said control apparatus for selecting and illuminating a plurality of series of lamps on said display board to indicate the courses of said flights of planes across said terrain, and means for indicating in the case of each flight indicator the particular course to which the flight information displayed by such indicator appertains.

6. In a signalling system, a display board representing a section of terrain, a plurality of lamps on said board uniformly spaced in coordinate directions, operator's control apparatus, a first selecting means operated by said control apparatus to select and illuminate a series of lamps to display the course of a flight of planes flying across said terrain, a second selecting means operated by said control apparatus to select and illuminate a series of lamps to display the course of a second flight of planes flying across said terrain, flight indicators individual to said two selecting means, respectively, and operated by said control apparatus to indicate flight information, and means included in each said flight indicator to associate the flight information indicated thereon with the corresponding flight displayed on said board.

CLYDE SMITH.